United States Patent
Ben Ahmed et al.

(10) Patent No.: US 6,794,791 B2
(45) Date of Patent: Sep. 21, 2004

(54) MOTOR/GENERATOR WITH ENERGIZED RELUCTANCE AND COIL IN THE AIR GAP

(75) Inventors: Abdel Hamid Ben Ahmed, Canada Parc (FR); Bernard Multon, Rennes (FR); Jérome Delamare, Grenoble (FR); Corentin Kerzreho, Rennes (FR); Jean-Yves Cognard, Bruz (FR); Nicolas Bernard, Bruz (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/149,127

(22) PCT Filed: Dec. 8, 2000

(86) PCT No.: PCT/FR00/03459

§ 371 (c)(1),
(2), (4) Date: Oct. 18, 2002

(87) PCT Pub. No.: WO01/43262

PCT Pub. Date: Jun. 14, 2001

(65) Prior Publication Data

US 2003/0057787 A1 Mar. 27, 2003

(30) Foreign Application Priority Data

Dec. 8, 1999 (FR) .............................................. 99 15494

(51) Int. Cl.⁷ .............................................. H02K 1/22
(52) U.S. Cl. .................... 310/268; 310/266; 310/168; 310/162; 310/164
(58) Field of Search ................. 310/162, 164, 310/166, 168, 171, 179, 180, 261, 264, 266–268, 12–37, DIG. 6

(56) References Cited

U.S. PATENT DOCUMENTS

| | | | | |
|---|---|---|---|---|
| 606,863 A | * | 7/1898 | Gutmann | 310/168 |
| 2,023,245 A | * | 12/1935 | Schou | 310/160 |
| 2,823,545 A | * | 2/1958 | Bodge | 74/5.41 |
| 2,997,611 A | * | 8/1961 | Feiner et al. | 310/164 |
| 3,096,455 A | * | 7/1963 | Hanh | 310/268 |
| 3,261,998 A | * | 7/1966 | Bosco, Jr. et al. | 310/126 |
| 3,275,863 A | * | 9/1966 | Fodor | 310/166 |
| 3,304,450 A | * | 2/1967 | Bosco, Jr. et al. | 310/126 |
| 3,467,845 A | * | 9/1969 | Wesolowski | 310/168 |
| 3,569,804 A | * | 3/1971 | Studer | 318/138 |
| 3,609,418 A | * | 9/1971 | Halas | 310/10 |
| 3,689,787 A | * | 9/1972 | Saretzky | 310/266 |
| 5,004,944 A | * | 4/1991 | Fisher | 310/266 |
| 5,198,711 A | * | 3/1993 | Eckersley | 310/12 |
| 5,710,476 A | | 1/1998 | Ampela | 310/268 |
| 5,982,074 A | | 11/1999 | Smith et al. | 310/261 |
| 6,177,746 B1 | * | 1/2001 | Tupper et al. | 310/166 |

FOREIGN PATENT DOCUMENTS

| | | |
|---|---|---|
| FR | 1.445.327 | 10/1966 |
| FR | 1.445.572 | 10/1966 |
| WO | WO 99/59236 | 11/1999 |

* cited by examiner

*Primary Examiner*—Dang Le
(74) *Attorney, Agent, or Firm*—Young & Thompson

(57) ABSTRACT

The invention concerns a machine forming a motor or generator including a stator and a rotor. The rotor is a passive rotor, consisting of two ferromagnetic discs whereof at least one is toothed. The stator includes a fixed polyphase field coil arranged in an air gap defined by the space provided between the two discs and generating a rotating magnetic field, and a field coil likewise fixed. The invention is applicable to a cylindrical rotary machine or to a machine with linear displacement.

24 Claims, 9 Drawing Sheets

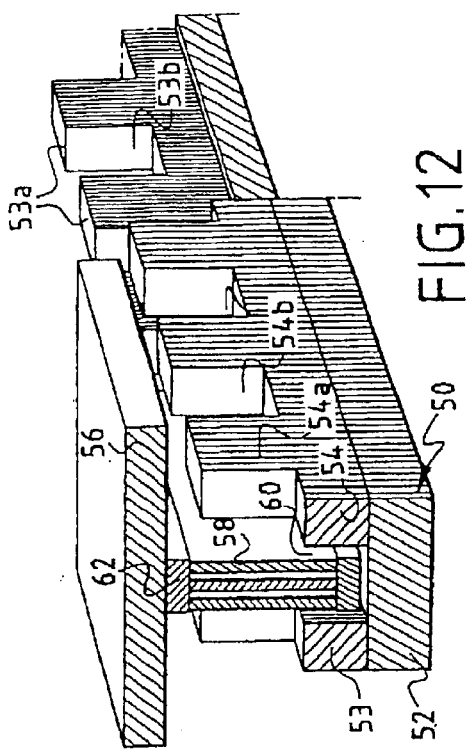
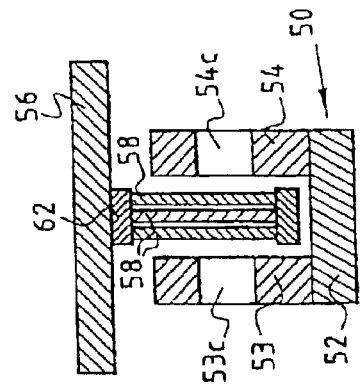
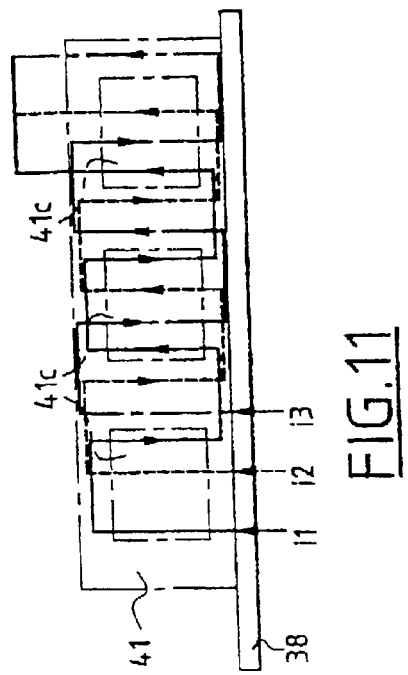
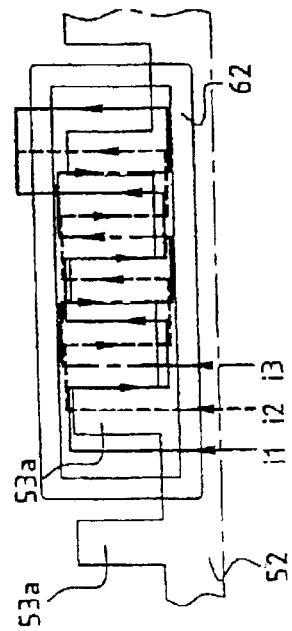
FIG.11
FIG.12
FIG.13
FIG.14

MOTOR/GENERATOR WITH ENERGIZED RELUCTANCE AND COIL IN THE AIR GAP

BACKGROUND OF THE INVENTION

The present invention is concerned with rotating machines and relates more particularly to energised reluctance machines.

In the context of electromechanical energy storage, electric machines acting as motors and generators are generally conventional structures (synchronous with permanent magnets or asynchronous).

The combination of the storage function, properly so called, which is provided by an inertia wheel, with the motor/generator function is effected in two ways:

"decoupled", where the motor/generator corresponds to a component of the most conventional topology, which is simply added on;

"integrated", where the machine forms part of the inertia wheel. In that case too, the machines used are relatively conventional in design.

With regard to the topologies used, they may be as follows:

pure variable reluctance synchronous machine, with a radial magnetic field and coil in the air gap, guiding of which is effected by ball bearings assisted by magnetic bearings (for example the "Active Power" system);

synchronous machine having permanent magnets with a radial or axial field and with a coil in the air gap or with a coil in slots (various constructions);

asynchronous machine with a coil in slots and a solid rotor (for example the "Japanese Flywheel" system).

Those topologies do not have adjustable energisation, and certain ferromagnetic elements are fixed. Such topologies therefore have three major disadvantages:

the existence of losses on no-load operation (storage operation), leading to substantial self-discharge (except for the asynchronous machine and the pure variable reluctance machine);

low flexibility of adjustment of the energy exchanges by adjustment of the induction current;

poor efficiency at low charge.

SUMMARY OF THE INVENTION

The object of the invention is to provide an electromagnetic motor/generator for the electromechanical storage of the electrical energy with very high efficiency, especially with low self-discharge, which can be integrated with an inertia wheel.

To that end, the machine must simultaneously satisfy the following criteria:

small losses on no-load operation, that is to say operation without current, which must be manifested in an absence of magnetic losses in the iron and in the coil and very few mechanical losses, no losses at the rotor despite the high rotational speeds (peripheral speed close to that of the inertia wheel), no disturbance of the magnetic bearings by parasitic forces, independent adjustment of the excitation flux for better control of the energy exchanges and a better power factor (minimum apparent power of the associated electronic converter), good integration with an inertia wheel.

The invention accordingly relates to an electric machine forming a motor or generator, comprising a fixed part and a movable part, in which one of the fixed and movable parts is passive and comprises two elements of ferromagnetic material which define between them a regular interval, said elements being connected to one another by a joining element which is likewise made of ferromagnetic material, and the other of said fixed and movable parts comprises a multiphase armature coil, which generates a shifting field, as well as a centralized field coil supplied by a direct current, said armature coil and field coil being arranged in an air gap defined by the regular interval, characterized in that at least one of said elements of ferromagnetic material is provided with openings.

According to other features:

the rotor is a passive rotor comprising two coaxial elements of revolution which are made of ferromagnetic material and at least one of which is provided with openings, which elements are connected to one another by a joining element which is coaxial with respect to the two elements of revolution and is likewise made of ferromagnetic material, and the stator comprises, arranged in an air gap defined by the regular interval formed between the two elements of revolution, a fixed armature coil, which generates a rotating field, and a field coil, which is likewise fixed, all the ferromagnetic elements are rotating, the rotor is composed of two ferromagnetic disks, at least one of which is toothed, the rotating disks are fixed on a shaft of ferromagnetic material, the fixed armature coil and the fixed field coil are arranged in the space between the disks, the armature coil is a multiphase coil whose phases are arranged in the same plane or according to superposed planes in the air gap formed by the rotating toothed disks, the phases of the armature coil are formed by turns which are offset angularly and are distributed regularly along the periphery of the machine, the field coil is arranged about the shaft and is surrounded by the armature coil, the field coil is a fixed global coil in the form of a solenoid, the rotor comprises a shaft surrounded by two coaxial cylinders of ferromagnetic material which are provided with teeth and cut-outs distributed regularly at one of their ends, and a joining flange of ferromagnetic material, the rotor comprises a shaft surrounded by two cylinders of ferromagnetic material which are provided with holes distributed regularly at one of their ends, and a joining flange of ferromagnetic material, the inner cylinder of ferromagnetic material is in one piece with the shaft of the rotor, the fixed part comprises a rail of ferromagnetic material having lateral walls provided with openings distributed regularly over its length, and the movable part comprises a support of non-magnetic material carrying an armature coil and a field coil which are arranged in an air gap defined by the regular interval between the lateral walls, the openings provided in the lateral walls of the rail are cut-outs separating teeth of said rail, the openings provided in the lateral walls of the rail are holes formed at regular intervals in said lateral walls.

BRIEF DESCRIPTION OF THE DRAWINGS

The invention will be better understood upon reading of the following description, which is given solely by way of example and makes reference to the attached drawings, in which:

FIG. 11 is a developed schematic view of the machine of FIG. 10;

FIG. 12 is a schematic perspective view of a linear electric machine according to the invention;

FIG. 13 is a schematic view showing the flow of the current in the machine of FIG. 12;

FIG. 14 is a schematic cross-sectional view of a variant of the linear electric machine of FIG. 12;

DETAILED DESCRIPTION OF THE PREFERRED EMBODIMENTS

Figure 1:
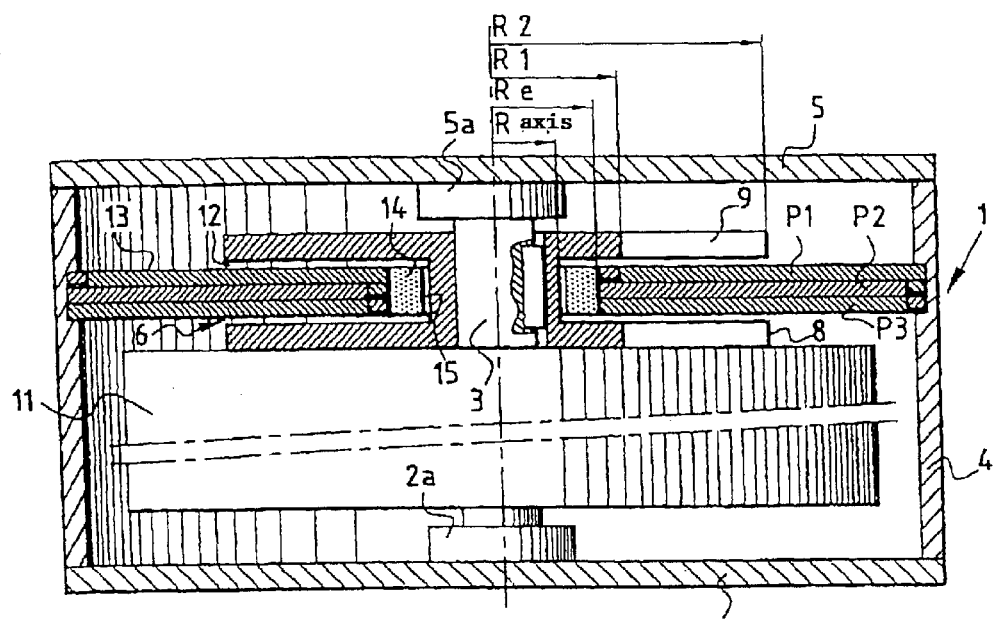
FIG. 1 is a front cutaway view of the electric machine associated with its inertia wheel according to the invention.

The machine shown in FIG. 1 comprises a casing 1 formed by a first flange 2 which supports a lower bearing 2a for the rotation of a shaft 3 and on which is mounted a tube 4 defining the lateral wall of the casing 1, and a second flange 5 which forms the cover and supports an upper bearing 5a.

Figure 2:
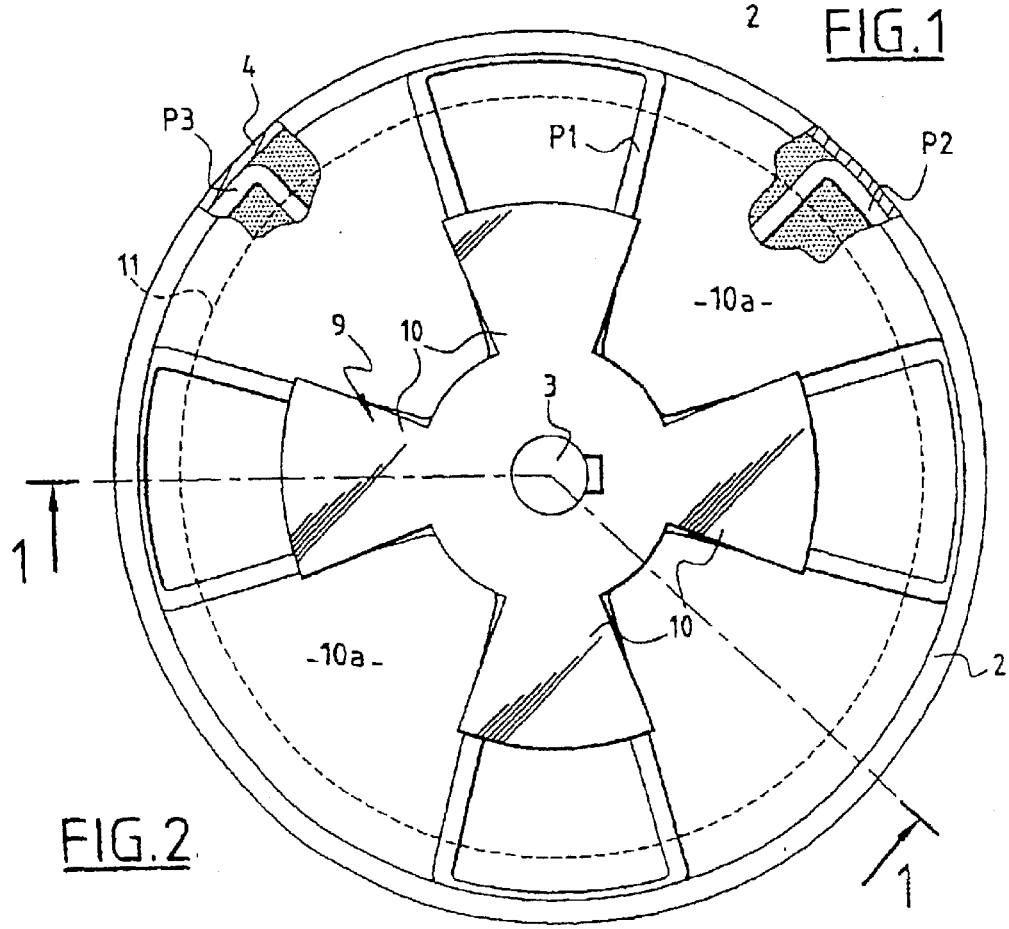
FIG. 2 is a top view, partially cut away, of the machine of FIG. 1.

Two toothed disks 8, 9 are mounted on the shaft 3, each disk having four teeth 10 (FIG. 2) separated by cut-outs 10a.

The lower disk 8 is integral with an inertia wheel 11 which, in this example, is of cylindrical shape.

In the space 12 formed between the disks 8, 9 there is arranged a distributed flat armature coil 13 surrounding a global field coil 14 in the form of a solenoid.

The field coil 14 is arranged between the two toothed disks 8, 9 in such a manner as to surround the shaft 3, with mechanical clearance 15.

The armature coil 13 is formed of turns which are offset angularly and distributed regularly.

As will be seen in FIG. 1, the three phases P1, P2 and P3 of the armature coil 13 are arranged according to three planes superposed on one another.

They may also be arranged in the same plane.

The armature coil is composed of a fixed multiphase coil, which in the present example is a three-phase coil.

Figure 3:
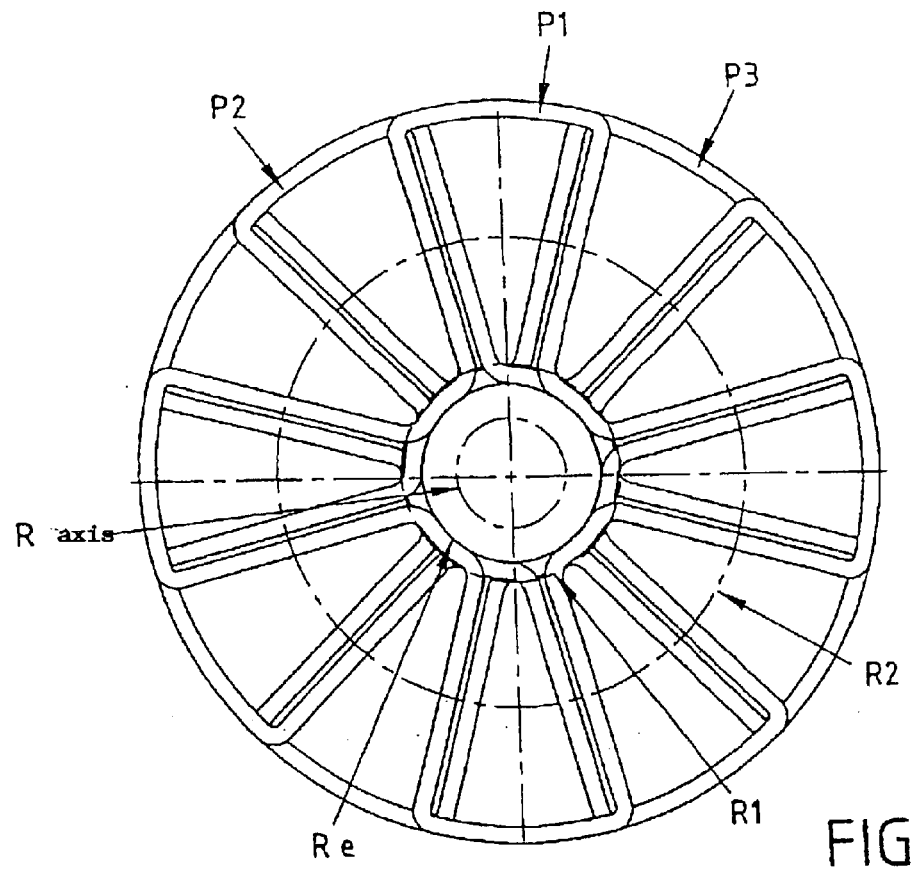
FIG. 3 is a schematic view of the armature coil of the machine according to the invention.

The coil shown by way of example in FIG. 3 is a coil for a motor/generator having four pairs of poles.

That figure shows the three phases P1, P2, P3 of the coil distributed uniformly along its periphery.

The principle of operation of the machine according to the invention is based on flux commutation.

The alternation of excitation flux viewed by a phase of the fixed armature coil is obtained from excitation by direct current and by the displacement of the pure reluctance circuit.

Figure 4:
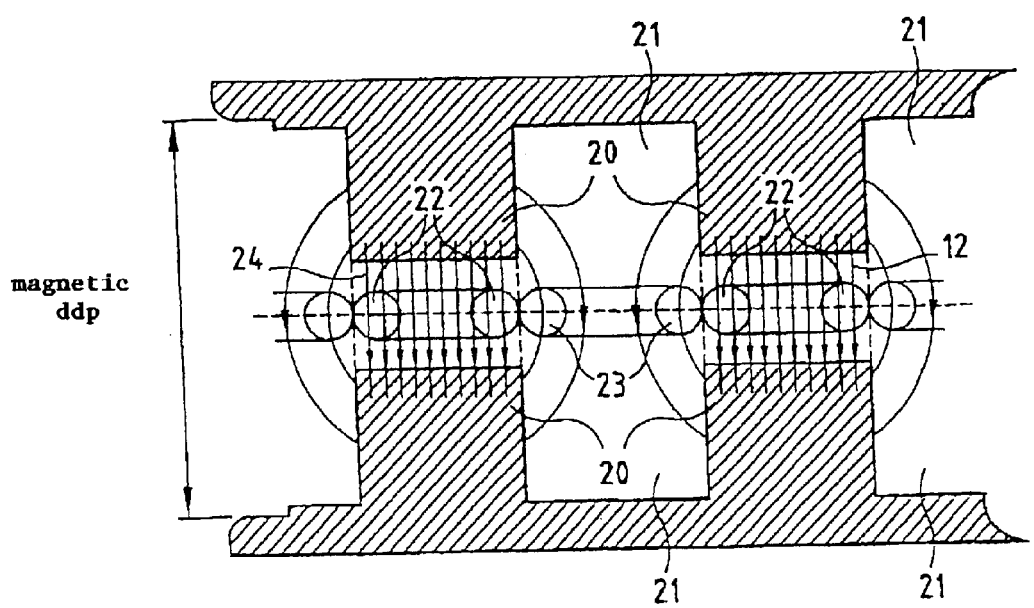
FIG. 4 is a linearly developed schematic view of an elementary structure of the machine according to the invention.

In order to illustrate that operation, a representative elementary structure shown in FIG. 4 and composed of magnetic teeth 20, cut-outs 21 and elementary turns 22, 23 will be considered.

The magnetic air gap 12 determined by the mechanical clearance between the magnetic teeth 20, increased by the height of the turns 22, 23, is magnetised off-load by an excitation coil which, in FIG. 4, is shown by the magnetic potential difference 24 at the terminals of the two toothed rotors 8, 9 (FIG. 1).

Figure 5:
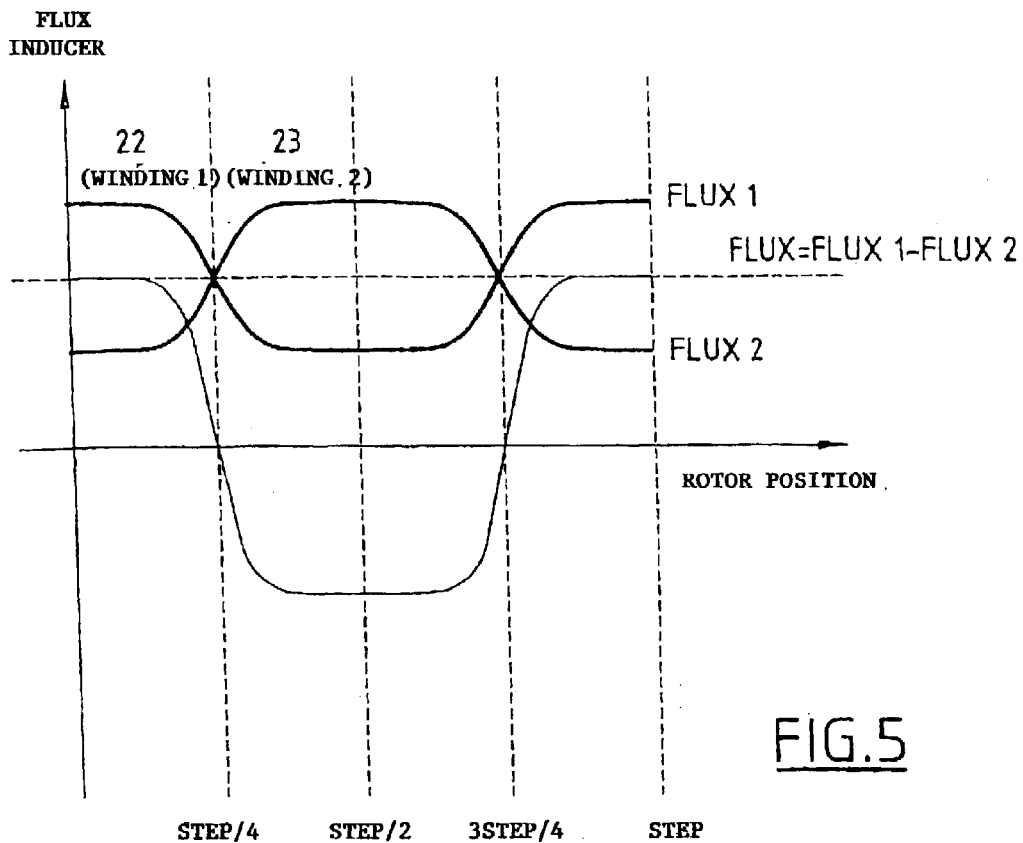
FIG. 5 is a diagram showing the variation of the excitation flux embraced by two turns of the structure of FIG. 4 as a function of the position of the rotor of the machine according to the invention.

The variation of the excitation flux in the turns 22 and 23 is shown in FIG. 5.

Accordingly, the total excitation flux viewed by the two turns in series of the arrangement of FIG. 4, forming the armature coil, corresponds to the difference in the flux of the two turns.

FLUX=FLUX 1−FLUX 2

It is an alternating quantity with an average value of zero.

Starting from that variation in the total excitation flux, it is possible to show the extreme characteristics of the operating cycle of the device in the "flux-ampere-turns" plane.

Figure 6A:
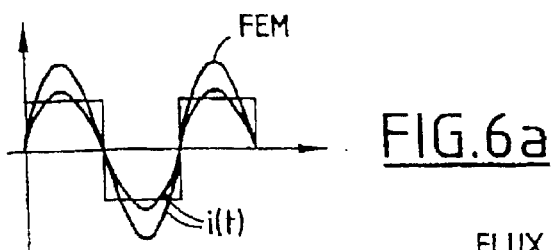
FIGS. 6a and 6b are diagrams showing the energy conversion cycles of the machine according to the invention in two cases of the supply of sinusoidal armature current or armature current of rectangular wave form.
Figure 6B:
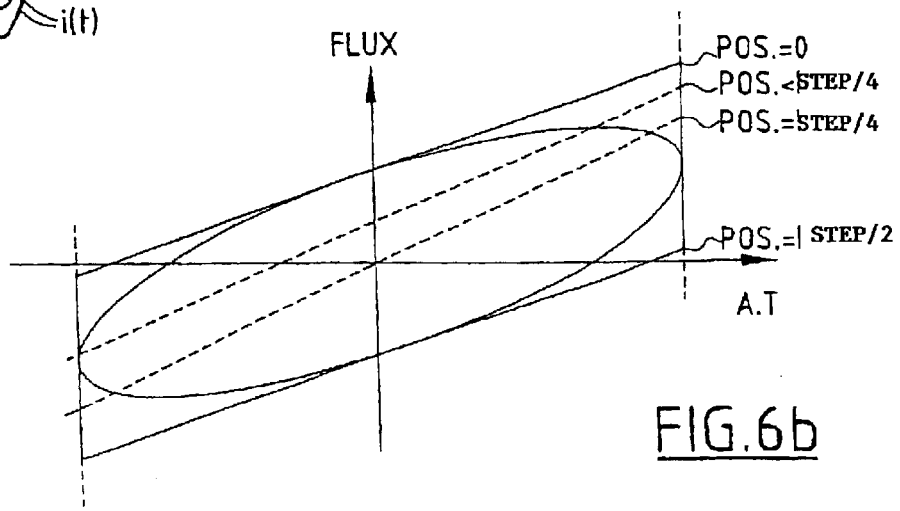

The shape of FIGS. 6a and 6b is thus obtained, FIG. 6a showing the armature current supplying a phase (sinusoidal or in rectangular wave form) synchronized with the electromotive force of that same phase, FIG. 6b showing the variation in the flux as a function of the ampere-turns. The area of the cycle so described is equal to the energy converted per supply period.

With regard to the effect of variable reluctance, it is possible to show that it is negligible in this structure.

Figure 7:
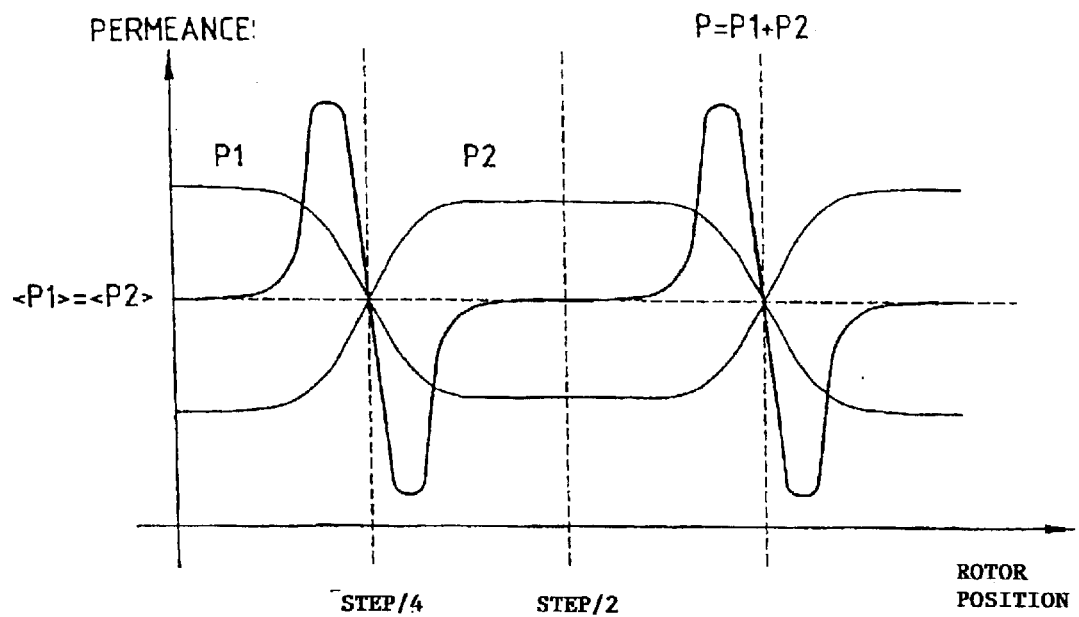
FIG. 7 is a diagram showing the permeances P1 and P2 viewed respectively by the two turns of the structure of FIG. 4 as a function of the position of the rotor.

In fact, FIG. 7 shows the variation in the permeances of each elementary turn described above, as well as the total permeance, which represents the permeance of a phase of the armature coil and is equal to the sum of the elementary permeances.

For a sinusoidal distribution, as a function of the position of the rotor, of the elementary permeances, the total permeance is constant.

For a different distribution, it is not very variable, as is shown in FIG. 7 and as it has been possible to demonstrate by finite element analysis and during experiments.

It will be noted, however, that if the total permeance of a phase is not constant and is therefore dependent on the position of the rotor, there is an additional, so-called reluctance couple resulting from coupling of the induced magnetic field with the magnetic circuit.

The structure of the motor/generator according to the invention combines four fundamental aspects, namely:

- a passive rotor which comprises neither a magnet nor a coil and which is therefore very robust mechanically and withstands the high speeds of rotation,
- no parasitic forces, the system thus being compatible with magnetic bearings,
- independent adjustment of the excitation flux,
- all the ferromagnetic elements are rotating and therefore view a constant magnetic field, as a result of which the iron losses are zero.

Thanks to the invention, it is possible substantially to prolong the duration of energy storage and accordingly to envisage electromechanical storage with a very high degree of autonomy.

The cost of the device according to the invention is also very low owing to its great simplicity of construction and the use of inexpensive materials.

The device according to the invention additionally has the following features:

- very few no-load losses because there is no magnetic no-load loss and only aerodynamic losses (which are nevertheless much reduced if the pressure is low owing to a partial vacuum),
- sealability,
- independent adjustment of the excitation, which gives a degree of additional freedom in the adjustment of the energy transfer,
- negligible axial or radial parasitic forces between the movable parts and the fixed parts,
- vibrations are negligible,
- excellent compatibility with magnetic bearings,
- ready integration of magnetic bearings,
- topology can be integrated wholly or partially with an inertia wheel.

The fields of application of the device according to the invention relate to the electromechanical storage of electrical energy for:

- consumers not connected to the supply system and supplied by renewable energies such as photo-voltaic energy, wind energy or the like;
- consumers connected to the supply system, in order to smooth out consumption, ensure autonomy in case of power cuts and the possibility of producing electricity from renewable energy sources.

The invention makes it possible to have a storage device with a very large number of charge-discharge cycles with very low self-discharge, to recycle the product easily at the end of its life and, finally, a product of relatively simple construction composed of inexpensive materials such as steel, copper and others.

Figure 8:
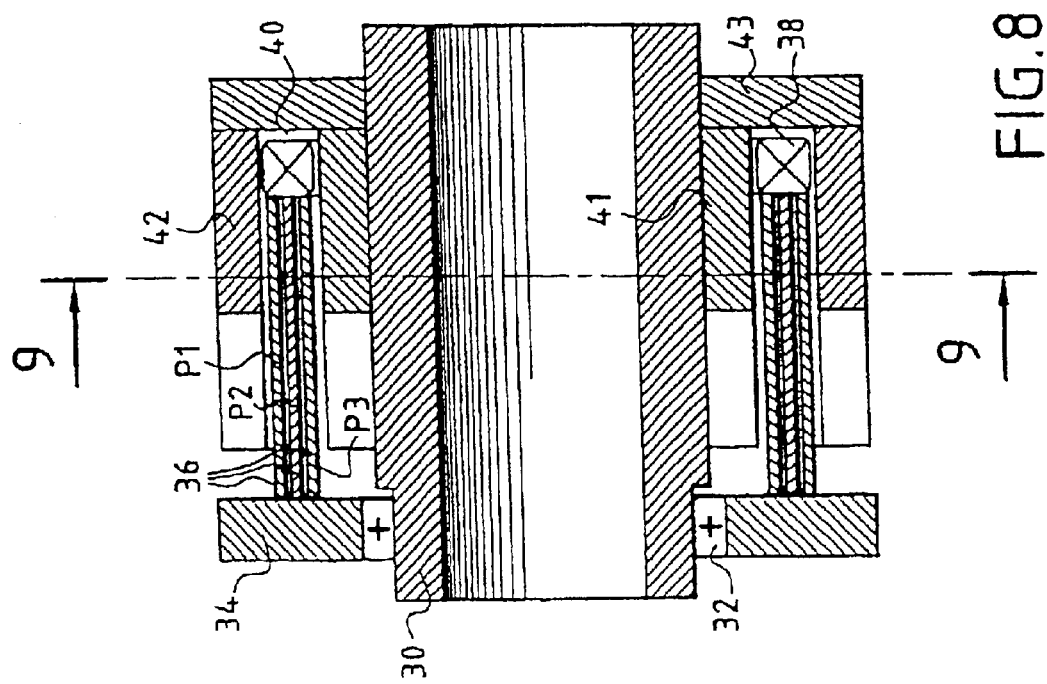
FIG. 8 is a cutaway front view of a machine according to the invention of generally cylindrical shape.

The machine shown in FIG. 8 is a variant of the machine described with reference to FIGS. 1 to 4.

It comprises a hollow shaft 30 rotatably mounted by way of a bearing 32 in a fixed flange 34 of non-magnetic material carrying a multiphase armature coil 36 whose three phases P1, P2, P3 are produced according to three coaxial cylinders surrounding the shaft 30.

At the end of the armature coil 36 opposite the non-magnetic flange 34 there is arranged a fixed field coil 38.

The armature coil 36 and the field coil 38 are arranged in the air gap defined by an interval 40 formed between two coaxial toothed cylinders of ferromagnetic material 41, 42 which are movable in rotation with the shaft 30 and are joined together by a flange 43 of ferromagnetic material.

The toothed cylinder 41 and the flange 43 are carried by the shaft 30. According to a variant, the inner cylinder 43 can be in one piece with the shaft 30, which is then made of magnetic material.

Figure 9:
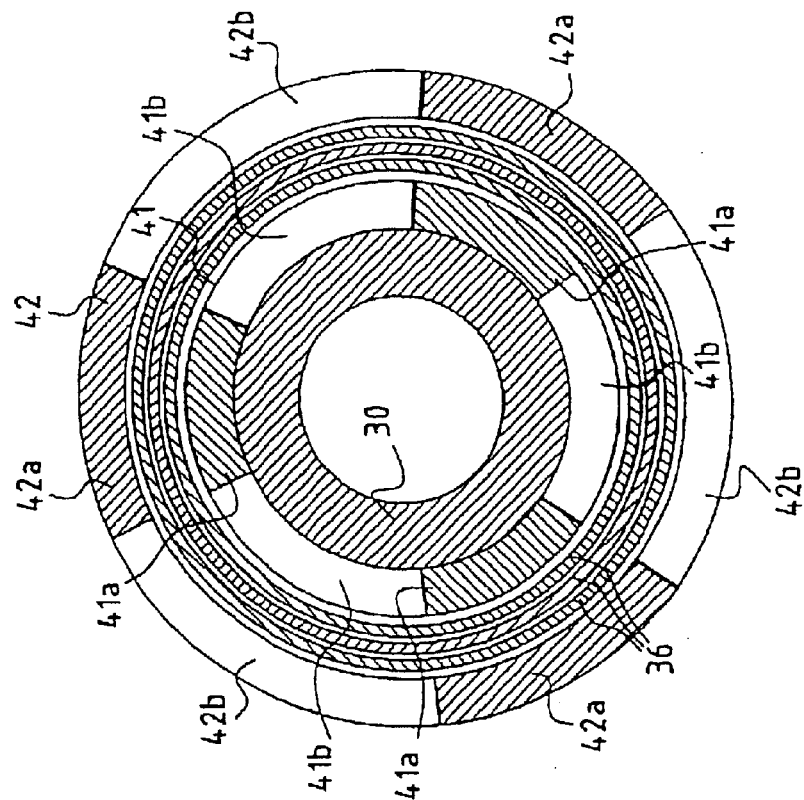
FIG. 9 is a cross-sectional view of the machine of FIG. 8.

The toothed cylinders 41 and 42 have teeth 41a, 42a, respectively, of which there are three in the present example, as shown in FIG. 9, which are separated by respective cut-outs 41b, 42b.

The shaft 30, the cylinders 41, 42 and the flange 43 form the rotor of the machine.

The armature coil 36 and the field coil 38 which are carried by the non-magnetic support 34 form the stator of the machine.

Figure 10:
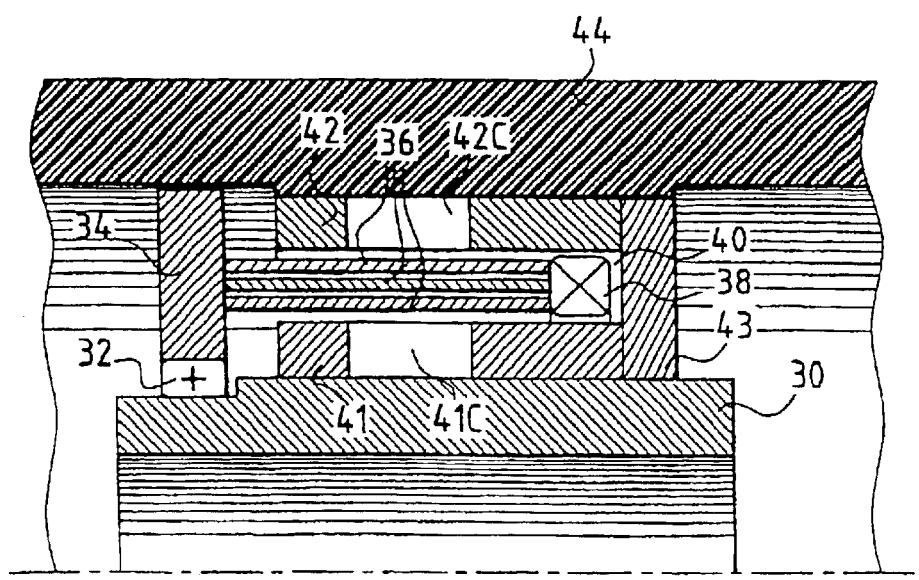
FIG. 10 is a cutaway front half-view of a variant of the machine of FIG. 8.

The machine shown in FIG. 10 is similar to that described with reference to FIGS. 8 and 9 except that, instead of having teeth and cut-outs, its cylinders 41, 42 have holes 41c, 42c distributed regularly at their periphery. The purpose of the holes 41c, 42c is the same as that of the cut-outs 41b, 42b in the embodiment of FIG. 8.

This variant of the machine according to the invention is suitable for receiving a hollow cylindrical energy-storing element 44 made of material having high mechanical strength (HMS) of the HMS metal type or carbon fibres or alternatively glass fibres.

FIG. 11 shows a developed view of the machine of FIG. 10.

That figure shows the circulation of the currents of the armature i1, i2, i3 in the three phases P1, P2, P3 of the armature coil which are offset relative to one another at regular intervals.

FIG. 12 is a schematic perspective view of a linear machine according to the invention.

That machine comprises a rail 50 of ferromagnetic material formed, for example, by a horizontal sole plate 52 and two lateral vertical plates 53, 54 provided with teeth 53a, 54a separated by cut-outs 53b, 54b.

Assuming for the purposes of the description that the rail 50 is fixed, the machine additionally comprises a movable non-magnetic horizontal support 56 carrying a vertical armature coil 58 which extends into an air gap 60 formed by the interval between the lateral plates 53, 54 of the rail 50 and with which there is associated a field coil 62.

The armature coil 58 is multiphase, three-phase in the present example, and, as is shown in FIG. 14, is surrounded by the field coil.

The assembly formed by the non-magnetic support 56, the armature coil 58 and the field coil is movable in translation relative to the rail 50.

It is, however, possible to envisage a machine in which the armature coil and the field coil, integral with their support, are fixed and the rail of ferromagnetic material is movable.

As will be seen in FIG. 13, the currents i1, i2, i3 of the three phases P1, P2, P3 of the armature behave in the linear machine of FIG. 12 in the same manner as in the rotating machine of FIG. 8 or 10.

The machine shown diagrammatically in FIG. 14 is similar in all points with the linear machine described with reference to FIGS. 12 and 13 except that, instead of having teeth and cut-outs like the machine of FIG. 12, it has in the lateral ferromagnetic plates 53, 54 holes 53c, 54c arranged at regular intervals.

Accordingly, the invention is applicable both to machines having an axial field of disk-shaped topology, such as a machine used for the storage of energy, and to machines having a radial magnetic field, of the cylindrical type, or having a transverse field, such as linear displacement machines.

In those machines, all the ferromagnetic elements view a constant magnetic field.

In machines other than linear displacement machines, the armature coil and the field coil are fixed.

The armature coil and the field coil are located in the air gap defined in the space between the ferromagnetic elements formed by the ferromagnetic disks in the case of the disk-shaped machine, the ferromagnetic cylinders in the case of the cylindrical machine, and the ferromagnetic plates in the case of the linear machine.

The excitation flux of the machine is adjustable.

The armature coil is multiphase and generates a rotating field in a rotating machine or a shifting field in a linear machine.

The field coil is centralized and supplied by a direct current.

The armature coil is a principal element of the machine according to the invention.

The appearance of the magnetomotive force created by the armature and the appearance of the electromotive force induced by the inductor are dependent thereon.

The losses are therefore dependent, for a large part, on the type and form of the coil chosen.

A coil in the iron would exhibit an excessive level of losses of magnetic origin at the speeds required for electromechanical energy storage.

The machine, motor/generator according to the invention uses a coil having a non-magnetic support.

The solution having a wire coil such as that of the machine of FIG. 1 presents the problem for the machine in question, called the actuator, of the space requirement due to overlapping of the inner end windings.

Such a solution leads to under-use of the air gap volume.

In order to overcome the problem of overlapping, it is proposed to distribute the field coil and the armature coil on the same plate of insulating material, such as epoxy, which also provides mechanical strength, by using, for example, a printed circuit etching process.

Figure 15:
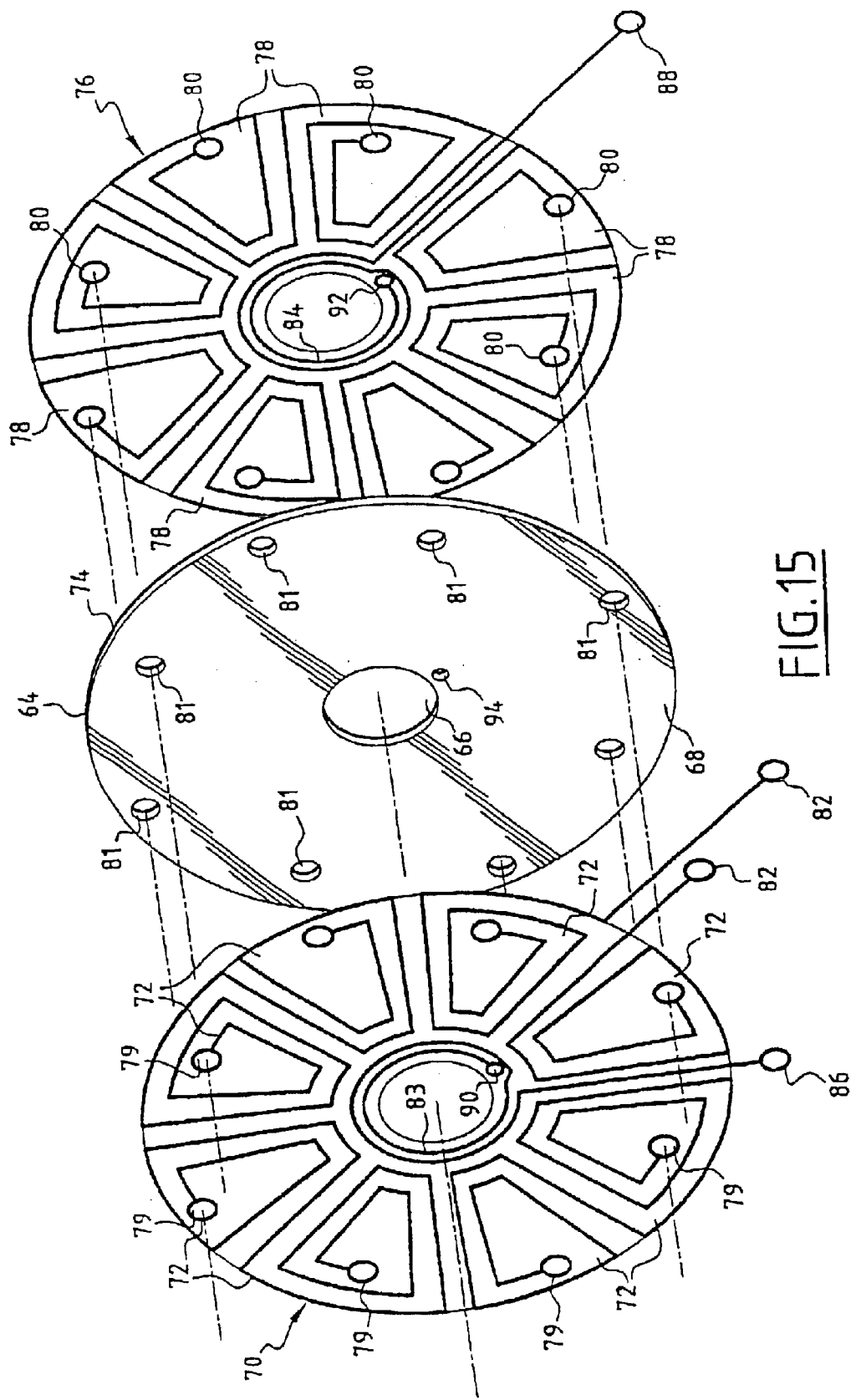
FIG. 15 is an exploded schematic perspective view showing a particular embodiment of a flat coil which can be used in the machine of FIG. 1.

The flat coil shown in FIG. 15 comprises a plate in the form of a disk 64 of insulating material, such as epoxy, which is provided with a central orifice 66 for the passage of an element for joining two toothed disks such as the magnetic disks 8, 9 of the machine of FIG. 1.

On a first face 68 of the plate 64 there is produced, for example by a printed circuit etching process, a first part 70 of an armature coil whose various poles 72 are arranged flat on the plate 64 and distributed at regular angular intervals over said plate.

On a second face 74 of the plate 64 there is produced, by the same process, a second part 76 of the armature coil whose poles 78 are likewise arranged flat on the plate 64 with the same angular offset as that of the poles 72 of the first part 70 of the armature coil.

Each of the poles 72, 78 of a face of the assembly or pancake coil so obtained is wound in the opposite direction to two adjacent poles, which creates magnetic pole alternation.

The poles 72, 78 created by the two faces of the pancake coil are superposed. They are therefore wound in the same direction.

Furthermore, the internal connections of the poles 72 of one face 68 which are provided by the terminals 79 are connected to the internal connections or terminals 80 of the corresponding poles 78 of the other face 74 by way of through-holes 81 formed in the plate 64 of insulating material and arranged at the periphery thereof opposite the terminals 79, 80 of the poles 72, 78 of the two armature coil parts 70, 76.

The number of poles 72, 78 of a pancake coil is equal to twice the number of teeth of a rotor disk such as the disks 8, 9 of the machine of FIG. 1.

The armature coil so formed has two external terminals 82 connected to two adjacent poles 72 of the first part 70. Each of the parts 70 and 76 of the armature coil has a circular configuration and comprises a central zone in which a field coil part 83, 84 is produced by the same printed circuit etching technique.

Each field coil part 83, 84 comprises an external terminal 86, 88 and an internal terminal 90, 92. The internal terminals 90, 92 are connected together by way of a through-orifice 94 formed in the insulating plate 64.

Figure 16:
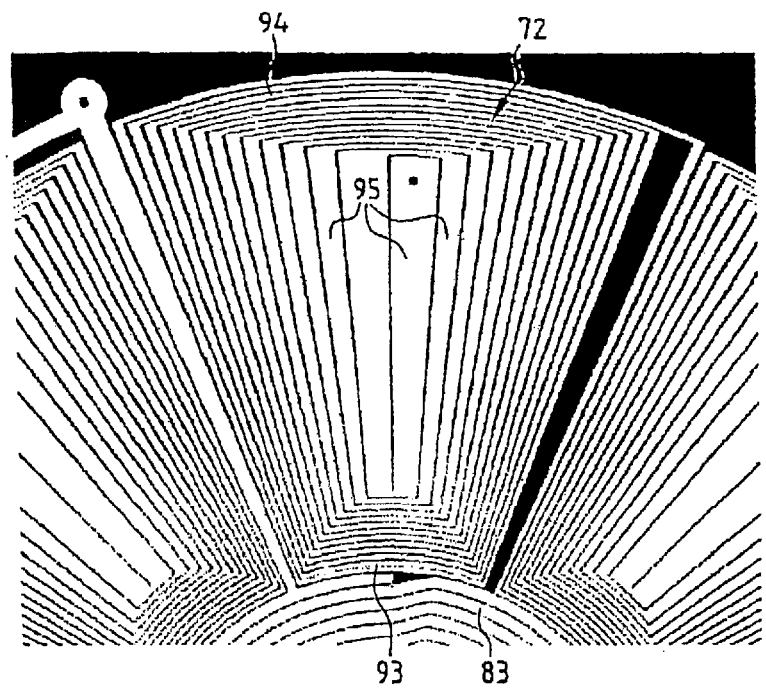
FIG. 16 is a partial view of FIG. 15 showing the structure of the flat coil of FIG. 15.

As is shown in the partial view of FIG. 16, in which there will be seen an example of a face of a pancake coil such as that of FIG. 15, a pole such as a pole 72 of the armature coil is formed by a flat-rolled printed conductor which comprises internal peripheral portions 93 and external peripheral portions 94 of constant cross-section, and radial portions 95 of variable cross-section which narrow from the periphery to the centre.

Furthermore, the widths of the portions 95 of the printed conductor, radial or transverse to the relative displacement between the fixed part and the movable part of the machine, diminish starting from the middle of a pole to its edges.

Such an optimised distribution of the conductors allows a magnetomotive force that is as sinusoidal as possible to be obtained.

It is, however, possible to envisage other optimisation criteria.

The cross-section of each of the conductors located in the active part, that is to say the part located beneath the toothed zone of the rotor disks, is dependent on the shape of the magnetomotive force which is desired to be obtained. The determination of that cross-section, for a given radius, can be carried out starting from a simple graphic analysis.

For a magnetomotive force (m.m.f.) of the desired shape, such as that shown by dotted lines in FIG. 18, and for a constant track thickness, the width of each track is obtained as follows:

i. the intersection of the curve representing the desired magnetomotive force with the integer levels of the ampere-turns determines the value $\Delta\theta_k$, ii. the width of the $k^{th}$ track, denoted $\Delta\theta_{track\ k}$, is obtained by subtracting from $\Delta\theta_k$ the value of the difference $\Delta\theta_i$ corresponding to the distance necessary for electrical insulation between two tracks.

$$\Delta\theta_{track\ k} = \Delta\theta_k - \Delta\theta_i$$

Figure 18:
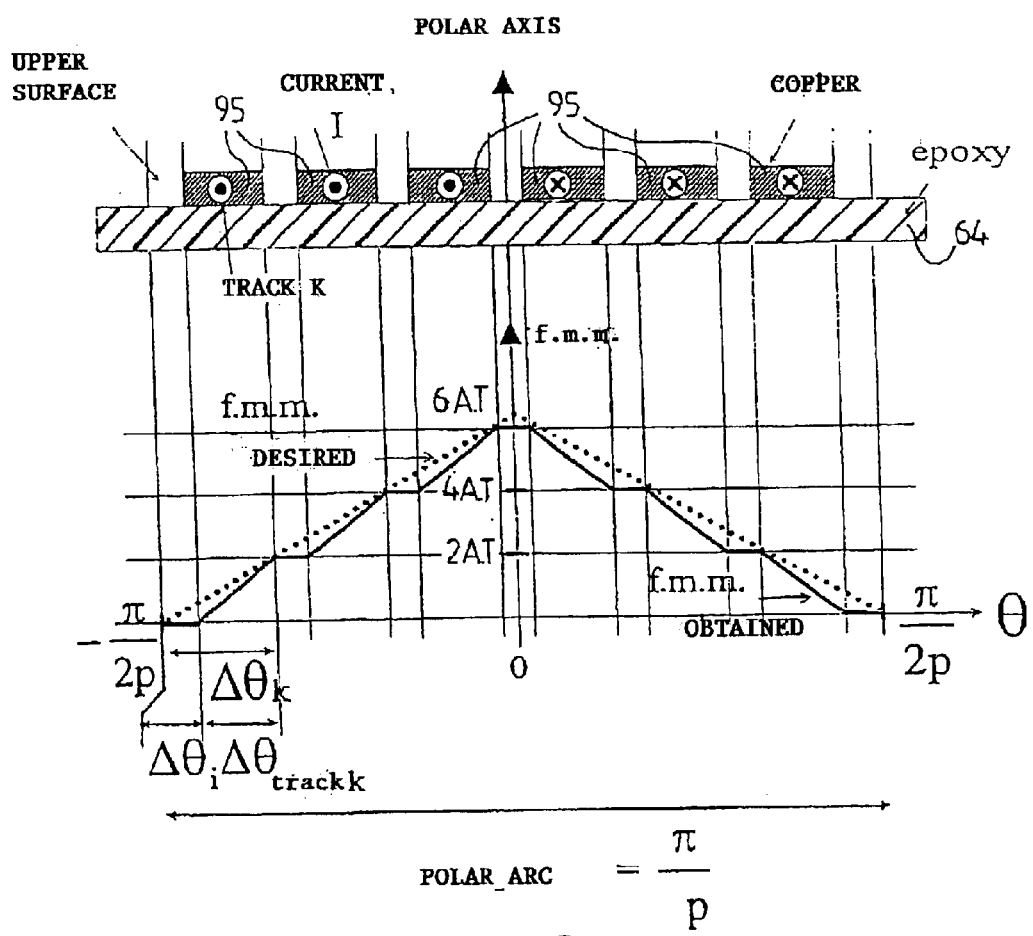
FIG. 18 is a graph showing the determination of the width of the conductors located in the active part of a coil such as that of FIG. 16.

By way of example, FIG. 18 shows, in the case of rotating machines, how to obtain the cross-section of the conductors forming a pole in the case where each pole comprises three turns and where the desired magnetomotive force is triangular. The top of the figure shows physically a face of the coil seen in section and for a given radius.

In that example, the conductors 95 in the form of copper tracks are arranged on the surface of a non-magnetic plate 64 of epoxy, for example, with a constant angular pitch $\Delta\theta_i$, necessary for electrical insulation between tracks.

In that precise example, the resulting track width is then constant.

Figure 19:
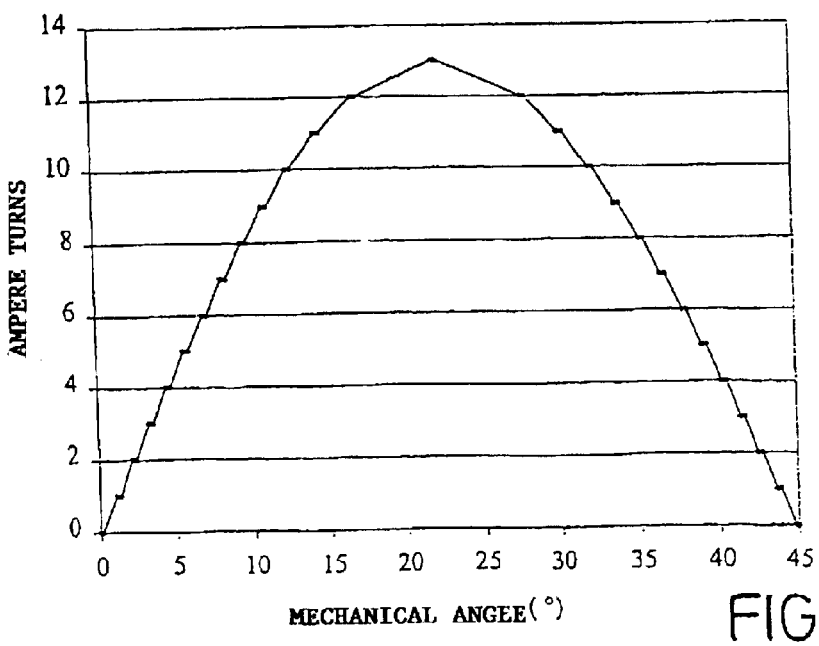
FIG. 19 is a graph showing the appearance of the optimised magnetomotive force, which has been rendered as sinusoidal as possible thanks to the graphic determination of the width of the conductors of FIG. 18.

In the case where the magnetomotive force is not triangular, the width of the variable tracks is determined using the method described above. Thus, the distribution of the conductors of the motor/generator in question, one face of a pancake coil of which is shown in FIG. 16, has been optimised to obtain, starting from 13 turns per pole and per phase, a magnetomotive force shown in FIG. 19 that is as sinusoidal as possible.

Figure 17:
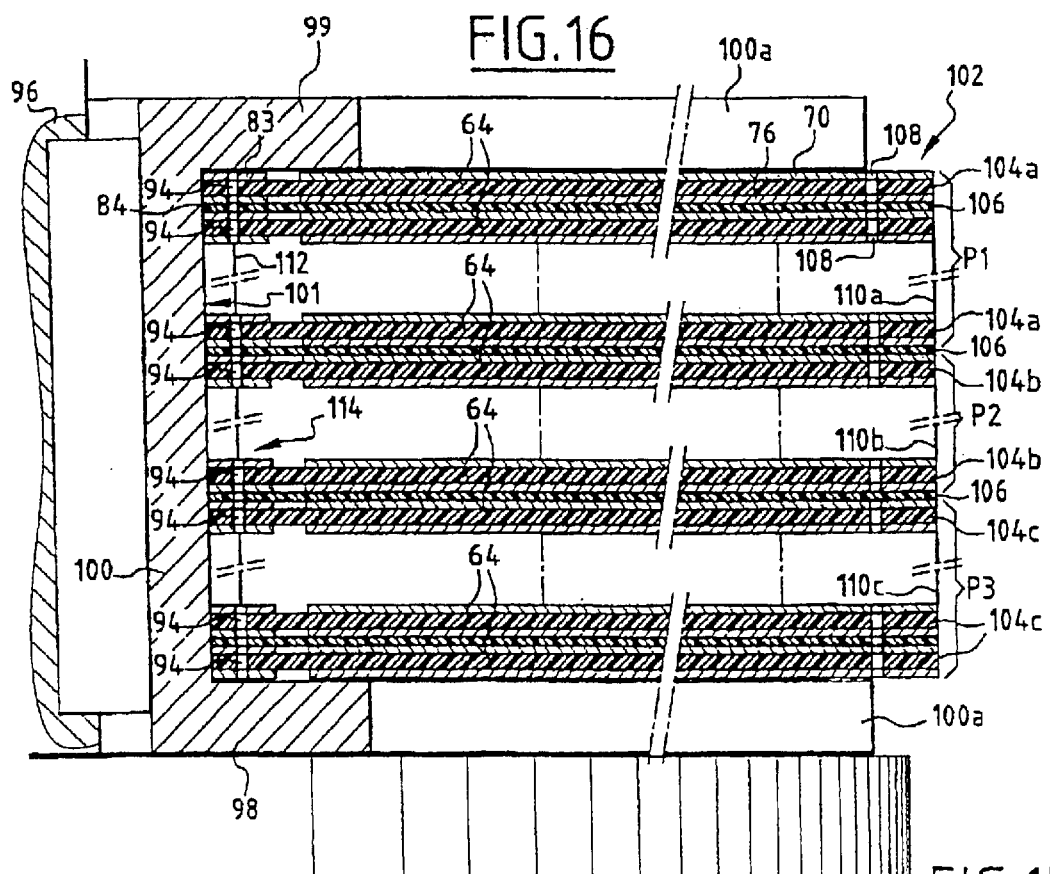
FIG. 17 is a partial cutaway view of an electric machine analogous to that of FIG. 1 but having a flat coil using the arrangement of FIG. 15.

FIG. 17 is a partial cutaway view on an enlarged scale of a machine analogous to that of FIG. 1.

FIG. 17 shows the shaft 96 carrying two toothed disks 98, 99 which are integral with a hub 100 keyed on the shaft, and which are provided with openings 100a.

In the space 101 formed between the toothed disks 98 and 99 there is arranged a three-phase armature coil 102 whose three phases $P_1$, $P_2$, $P_3$ are each formed of a plurality of respective pancake coils 104a, 104b, 104c such as that described with reference to FIG. 15, which are stacked on one another with the interposition of a layer 106 of electrical insulation between the pancake coils 104a, 104b, 104c.

In FIG. 17, only the outer pancake coils of each stack of phases P1, P2, P3 are shown.

Of course, the coil may comprise only one pancake coil per phase.

In the case of a monophase machine, it comprises at least one pancake coil of the above-mentioned type.

The pancake coils 104a, 104b, 104c of each phase P1, P2, P3 each comprise an armature coil 70, 76 and a field coil 83, 84 each formed of two parts printed on the two faces of a disk 64 of insulating material in the manner described with reference to FIG. 15.

The two parts 70, 76 of each armature coil are connected to one another by through-conductors 108. The armature coils of the pancake coils 104a forming the same phase P1 are connected to one another in series by conductors 110a.

Likewise, the armature coils of the pancake coils 104b and 104c forming the phases P2 and P3, respectively, are connected to one another by conductors 110b and 110c.

The field coils 83, 84 of the assembly of pancake coils 104a to 104c forming the three phases are connected in series by conductors 112 and constitute a centralized field coil 114.

The number of printed circuit pancake coils used to produce the phases P1, P2, P3 is chosen so that the resulting coil occupies a maximum volume between the toothed disks 98, 99.

Thanks to the use and the stacking of a plurality of double-faced printed circuits of the type described with reference to FIG. 15, overlapping of the end windings is avoided.

In the case of a three-phase displacement machine, the phases P1, P2, P3 are offset relative to one another by a value corresponding to two thirds of a pole such as one of the poles 72 of the coil of FIG. 15.

The type of coil just described with reference to FIGS. 15 to 17 can be transposed directly, by simple development, to linear machines such as those described with reference to FIGS. 11 to 14.

In the case of a linear machine, the offset between poles is effected according to the direction of relative displacement of the fixed part and the movable part.

The technology described with reference to FIGS. 15 to 17 allows the following advantages to be obtained:

a field coil and an armature coil arranged on the same non-magnetic element which is not a conductor of electricity (epoxy, for example) and which provides mechanical strength;

a virtually sinusoidal magnetomotive force obtained in a very simple manner by the use of tracks of variable cross-sections, which is advantageous for minimising magnetic losses in disks of iron;

better use of the coilable space;

the possibility of increasing the thermal exchange surfaces with the exterior by increasing the cross-section of the end windings;

a reduction in Joule losses by increasing the cross-section of the end windings;

increased simplicity of production, which is advantageous for automation and for reducing production costs.

What is claimed is:

1. Electric machine forming a motor or generator, comprising:

a fixed part and a movable part, one of the fixed and movable parts is passive and comprises two elements which define therebetween a regular interval, said two elements being connected to one another by a joining element, and an other of said fixed and movable parts comprises a multiphase armature coil, which generates a variable magnetic field, and a centralized field coil, which is supplied by a direct current, said armature coil and field coil being arranged in an air gap defined by the regular interval, the two elements and the joining element being made of ferromagnetic material, all the ferromagnetic elements of the machine being located on said one of the fixed and movable parts comprising the two elements, and at least one of said two elements being provided with openings.

2. Rotating machine according to claim 1, comprising a stator and a rotor, wherein said passive part is a passive rotor comprising two coaxial elements of revolution which are made of ferromagnetic material and at least one of which is provided with openings, wherein said joining element is coaxial with respect to the two elements of revolution and is made of ferromagnetic material, wherein said active part is a stator which comprises, arranged in said air gap said armature coil, which generates a rotating field, and said field coil.

3. Rotating machine according to claim 2, wherein all the ferromagnetic elements are rotating.

4. Rotating machine according to claim 2, wherein the rotor is composed of two ferromagnetic disks, at least one of which is toothed.

5. Rotating machine according to claim 2, wherein the two elements are fixed on a shaft of ferromagnetic material.

6. Rotating machine according to claim 2, wherein the armature coil is a multiphase coil whose phases are arranged in the same plane or according to superposed planes in the air gap.

7. Machine according to claim 2, wherein phases of the armature coil are formed by turns which are offset angularly and are distributed regularly along the periphery of the machine.

8. Machine according to claim 2, wherein the joining element is a shaft and said field coil is arranged about the shaft and is surrounded by the armature coil.

9. Machine according to claim 2, wherein the field coil is a fixed global coil in the form of a solenoid.

10. Machine according to claim 2, wherein the rotor comprises a shaft surrounded by two coaxial cylinders of ferromagnetic material which are provided with teeth and cut-outs distributed regularly at one end of the coaxial cylinders, and a joining flange of ferromagnetic material.

11. Machine according to claim 10, wherein an inner cylinder of ferromagnetic material is in one piece with the shaft.

12. Machine according to claim 2, wherein the rotor comprises a shaft surrounded by two cylinders of ferromagnetic material which are provided with holes distributed regularly at one end of the coaxial cylinders, and a joining flange of ferromagnetic material.

13. Electric machine according to claim 1, of the linear displacement type,
wherein the fixed part comprises a rail of ferromagnetic material having lateral walls provided with openings distributed regularly over its length, and
wherein the movable part comprises a support of non-magnetic material carrying an armature coil and a field coil which are arranged in the air gap defined by the regular interval between the lateral walls.

14. Electric machine according to claim 13, wherein the openings provided in the lateral walls of the rail are cut-outs separating teeth of said rail.

15. Electric machine according to claim 13, wherein the openings provided in the lateral walls of the rail are holes formed at regular intervals in said lateral walls.

16. Electric machine according to claim 1, wherein the armature and field coils are formed by stacking and interconnecting pancake coils in a number of at least one pancake coil per phase, the pancake coils each comprising two armature coil parts and two field coil parts formed by printed circuits produced on two faces of a plate of insulating material.

17. Electric machine of the multiphase type according to claim 16, wherein each phase of the coil of the machine is formed by stacking and interconnecting corresponding pancake coils and offsetting according to the displacement of the stacks of pancake coils of the different phases relative to one another.

18. Electric machine according to claim 16, wherein the armature coil parts and the field coil parts of a pancake coil are connected to one another by through-conductors which are engaged in through-holes formed in the insulating plate.

19. Electric machine according to claim 16, wherein each part of the armature coil of each pancake coil has poles which are distributed at regular intervals on the plate of insulating material, each of the poles of a face being wound in the opposite direction to the two poles which are adjacent thereto, thus creating magnetic pole alternation.

20. Electric machine according to claim 19, wherein the poles of the two faces of a pancake coil are superposed and are wound in the same direction in pairs.

21. Electric machine according to claim 20, wherein widths of portions of the printed connector that are transverse to the displacement diminish from the middle of each pole to its edges.

22. Electric machine according to claim 21, wherein, for a shape of the curve of the desired magnetomotive force and for a constant thickness of the conductors, the width $\Delta\theta_{track\ k}$ of said conductors is given by the equation $\Delta\theta_{track\ k}=\Delta\theta_k-\Delta\theta_i$ in which $\Delta\theta_k$ is the intersection of the curve of the desired magnetomotive force with an integer level of the ampere-turns, and $\Delta\theta_i$ is the value of the distance between two adjacent conductors necessary for thermal insulation between two tracks.

23. Rotating electric machine according to claim 16, wherein each armature coil pole of a pancake coil is formed by a flat-wound printed conductor which comprises radial portions of variable cross-section which narrow from the periphery to the center of said pancake coil.

24. An electric machine forming a motor or generator, comprising:
a fixed part and a movable part,
wherein one of said fixed and movable parts is passive and comprises two elements that define therebetween an air gap, said two elements being connected to one another by a shaft, and at least one of said two elements having plural openings therein,
wherein an other one of said fixed and movable parts comprises a multiphase armature coil and a centralized field coil, said armature coil and field coil being arranged in said air gap,
wherein only said two elements and said shaft being made of ferromagnetic material.

* * * * *